United States Patent [19]

Igarashi et al.

[11] Patent Number: 5,297,337
[45] Date of Patent: Mar. 29, 1994

[54] METHOD OF HOSE-METAL FITTING ATTACHMENT

[75] Inventors: Shigeru Igarashi; Osamu Ozawa, both of Hiratsuka; Tetsu Kitami, Hadano, all of Japan

[73] Assignee: The Yokohama Rubber Co., Ltd., Tokyo, Japan

[21] Appl. No.: 895,721

[22] Filed: Jun. 9, 1992

Related U.S. Application Data

[62] Division of Ser. No. 489,029, Mar. 6, 1990, Pat. No. 5,149,732.

[30] Foreign Application Priority Data

Mar. 7, 1989 [JP] Japan .................. 1-54732
May 8, 1989 [JP] Japan .................. 1-114551

[51] Int. Cl.$^5$ .................. F16L 9/14; B21D 39/00
[52] U.S. Cl. .................. 29/890.144; 29/455.1; 29/458; 29/508; 29/516
[58] Field of Search .................. 29/890.144, 235, 237, 29/455.1, 458, 508, 516, 517; 524/315; 525/101, 104, 105; 156/333, 334, 307.3

[56] References Cited

U.S. PATENT DOCUMENTS

| | | | |
|---|---|---|---|
| 2,248,969 | 7/1941 | Darling | 29/890.144 X |
| 3,066,060 | 11/1962 | Gross | 525/105 |
| 4,118,436 | 10/1978 | Craven | 525/101 |
| 4,463,129 | 1/1984 | Shimada et al. | 525/101 |
| 4,503,189 | 3/1985 | Igarashi et al. | 525/105 |
| 4,669,757 | 6/1987 | Bartholomew | 29/455.1 X |
| 4,804,212 | 2/1989 | Vyse | 29/237 X |
| 5,109,600 | 5/1992 | Holden et al. | 29/237 X |
| 5,127,157 | 7/1992 | Oetiker | 29/890.144 |
| 5,142,782 | 9/1992 | Martucci | 29/890.144 |
| 5,162,156 | 11/1992 | Troughton, Jr. et al. | 156/333 X |

*Primary Examiner*—Timothy V. Eley
*Attorney, Agent, or Firm*—Finnegan, Henderson, Farabow, Garrett & Dunner

[57] ABSTRACT

Rubber compositions are disclosed for integral attachment of polymeric and metallic materials. Improved bondability is attributed to the use of a selected base rubber blended with a selected class of inorganic or organic fillers, silane compounds and vulcanizing agents such that the finished composition is provided with a specified range of Mooney viscosities. Also disclosed is a method of hose-metal fitting connection by the application of the composition. Gas- and oil-impermeability characteristics are greatly enhanced.

4 Claims, 1 Drawing Sheet

METHOD OF HOSE-METAL FITTING ATTACHMENT

This is a division of application Ser. No. 07/489,029, filed Mar. 6, 1990 now U.S. Pat. No. 5,149,732.

BACKGROUND OF THE INVENTION

1. Field of the Invention

This invention is directed to rubber compositions cabable of adhesion to both polymeric and metallic materials. Such composition is useful generally for adhesive bonding of a thermoplastic resin to a metallic material and particularly for firm attachment of a metal fitting to a hose construction. The invention further relates to a method of jointing a coupler on to a hose.

2. Description of the Prior Art

Polymeric materials have of late found application to a wide variety of industrial sectors and household commodities. This trend has lent an impetus to the production of composite polymer materials in which a polymer and a metal are bonded together into an integral structure and further to the development of adhesive compositions for polymer-to-metal bonding.

Prior adhesive compositions are applicable for instance to automotive hoses for air-conditioning and fuel-transporting use. As refrigerants a family of gases known as chlorofluorocarbons (CFCs) have been employed among which dichlorodifluoromethane (CFC 12) is typified. CFC 12, however, is reported to rise into the stratophere and erode the ozone layer that screens out dangerous solar rays and thus induce cutaneous cancer in some cases. The world's industrial nations are required to phase out the use of such ozone-depleting chemical. 1,1,1,2-Tetrafluoroethane (HFC 134a) is considered to be one safe substitute.

An urgent need has arose, in addition to safety examination of HFC 134a by experts, for means ensuring leak-proof, maintenance-free transport of that gas as a refrigerant.

Various hoses have been Proposed for use in transporting or otherwise handling refrigerants and fuels. One such hose is constructed with a core tube formed from a acrylonitrile-butadiene rubber (NBR) or chlorosulfonated polyethylene (CSM) for its good oil-resistance and refrigerant- and fuel-impermeable properties. To further improve impermeability, another hose has assembled a combination core including an inner peripheral wall of a thermoplastic resin such as a nylon and an outer peripheral wall of a rubbery material such as NBR, CSM or butyl rubber (IIR). Either type of hose is usually provided at each of its opposite ends with an aluminum joint fixed by the use of an adhesive composition for connection to the companion part.

The last-mentioned, laminated-cored hose has a drawback in that on prolonged exposure to a temperature exceeding a working temperature, say from 140 to 160° C., it gets flattened at the inner resinous wall under stresses originating from the joint. In such instance the hose is susceptible to leakage at a lower pressure than a working pressure usually of from 15 to 30 kgf/cm² and even at the working temperature. This is evidenced by the following performance tests in which the hose has been examined for air tightness after aging at varying temperatures for different lengths of time.

| temperature (°C.) | time (hr) | pressure (kgf/cm²) |
| --- | --- | --- |
| 120 | 168 | not leaked at 40 |
| 140 | 168 | leaked at less than 5 |
| 150 | 168 | leaked at less than 5 |
| 160 | 24 | leaked at less than 5 |

The foregoing hose of a combination core type is wholly unsatisfactory as it is prone to leak only under appreciable stress particularly where it is by sheer accident subject to a higher temperature for a longer period of time. This is literally responsible for laborious maintenance and often for hazardous operation.

The above problems have been coped with by the use of metal joints constituted of a nipple and a socket, the nipple being structured in a trapezoidally channeled, serrated or voluted shape and the socket formed to suit wavy or flat clamping. None of these attempts works to satisfaction from the leakproofness point of view. Alternatively, it is known that a hose body and a metal fitting can be clamped with an O-ring or sleeve interposed therebetween. In this mode of clamping, the packing is objectionably displaceable and difficult to position in place while in interengagement of the hose with the fitting.

To attain integral bonding between a composite hose and a metal joint, it has been proposed that a chlorinated rubber cement be used as an adhesive. This cement tends to adversely affect the resinous material constituting an inner wall of the hose core, rendering the resultant hose assembly sensitive to stress crack and hence fluid leak.

SUMMARY OF THE INVENTION

With the existing situation of the prior art in view, the present invention seeks to Provide a novel rubber composition which is adhesively bondable to polymeric and metallic materials, sufficiently durable against severe vibration and repetitive pressurization and rather inert to thermosetting and thermoplastic resins.

Another object of the invention is to provide a method of intergrally jointing a composite hose with a metal coupler with the use of such rubber composition.

The rubber composition according to the invention contemplates particular utility in automobile hoses, contributing to leak-proof, maintenance-free transport of refrigerants such as CFC 12 and HFC 134a and a fuel such as gasoline.

The above and other objects and features of the invention will become better understood from the following description taken in conjunction with the accompanying drawings.

More specifically, one aspect of the invention provides a rubber composition for use in bonding a polymer and a metal into an integral structure, which comprises (a) a base rubber, (b) at least one inorganic or organic filler, the inorganic filler having a hydrochloric acid-soluble content of not more than 3 percent, the filler totalling at an amount of from 30 to 300 parts by weight per 100 parts by weight of the base rubber, (c) a silane coupling agent in an amount of greater than 2 parts by weight per 100 parts by weight of the base rubber and (d) a vulcanizing agent whereby the composition has a minimum viscosity of from 45 to 120 as determined at 125° C. on a Mooney viscometer.

According to another aspect of the invention, these is provided a method of integrally attaching a composite hose to a metal joint, the hose comprising an inner tube, a reinforcing layer and a cover superimposed in the order mentioned, the core tube including an inner peripheral wall formed of a polymeric material and an outer peripheral wall formed of a rubbery material, which method comprises (e) disposing a rubber composition peripherally over the hose at an end thereof and in a predetermined area, (f) mounting the joint on the hose end having the composition carried thereon and (g) subsequently clamping the joint into fixed relation to the hose end, the rubber composition comprising (a) a base rubber, (b) at least inorganic or organic filler, the inorganic filler having a hydrochloric acid-soluble content of not more than 3 percent, the filler totalling at an amount of from 30 to 300 parts by weight per 100 parts by weight of the base rubber, (c) a silane coupling agent in an amount of greater than 2 parts by weight per 100 parts by weight of the base rubber and (d) a vulcanizing agent whereby the composition has a minimum viscosity of from 45 to 120 as determined at 125° C. on a Mooney viscometer.

DETAILED DESCRIPTION OF THE INVENTION

Figure 1:
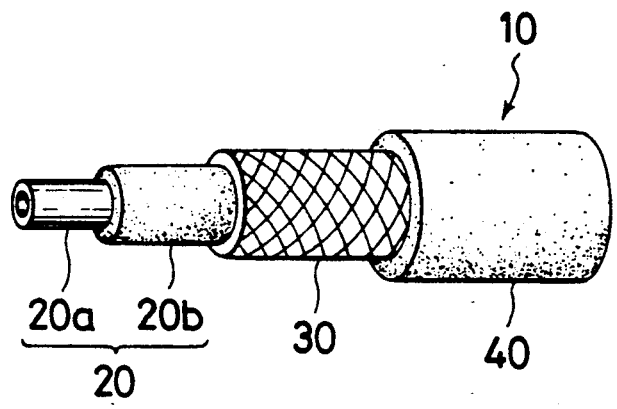
FIG. 1 is a perspective view, segmentally seen and partly cut away, of a hose construction to which the principles of the present invention are applied.

With reference to FIG. 1, there is shown a typical example of a composite hose designated at 10 and adapted to be used in the present invention. The hose 10 is built with an inner tube 20, a reinforcing layer 30 and a cover 40 superimposed in the order mentioned. The tube 20 is generally of a two-layered structure having an inner peripheral wall 20a formed of a thermoplastic material and an outer peripheral wall of a rubbery material. Labeled at 50 is a metal fitting made up of a socket 50a and a nipple 50b and arranged to hold one end of the hose 10 in clamped relation, as illustrated in FIG. 2, for engagement with the corresponding part intended.

Figure 2:
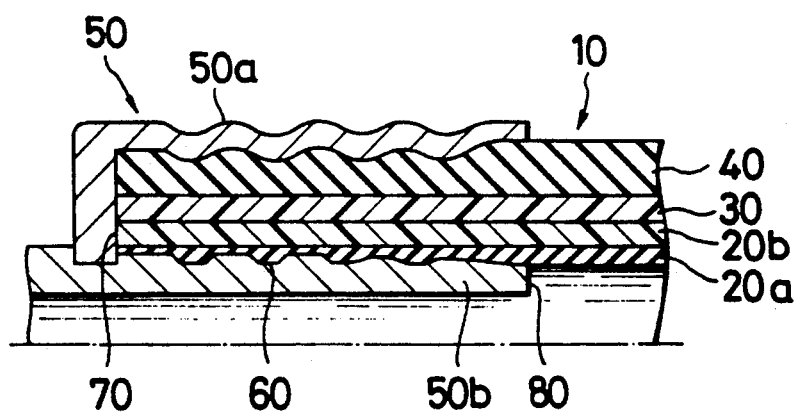
FIG. 2 is a partly enlarged, cross-sectionally taken view showing the manner in which the hose of FIG. 1 has been assembled at its one end with a metal joint.

A rubber composition according to the invention is disposed as an adhesive agent 60 in a region defined between the inner wall 20a of the tube 20 and the nipple 50b of the fitting 50 as viewed in FIG. 2 in a warpwise direction and between a front end 70 of the socket 50a and a rear end 80 of the nipple 50b as seen in a weftwise direction.

The rubber composition, provided in accordance with one preferred embodiment of the invention, is comprised of a base rubber, one or more inorganic fillers having a specified hydrochloric acid-soluble content, or an organic filler, a silane coupling agent and a vulcanizing agent. Thus the composition is designed to have a viscosity of from 45 to 120 as determined at 125° C. on a Mooney viscometer. Such rubber composition is highly capable of exhibiting superior bondability to polymers and to metals, thus ensuring sufficient impermeability to gases and to oils on application to automotive hoses in particular.

Polymers used for purposes of the invention may be selected from thermoplastic resins such as polyethylenes, polyvinyl chlorides, polyamides typified by nylon-6, nylon-66, nylon-8, nylon-10, nylon-11, nylon-12, nylon-666, nylon-610 and the like, polyamide-polyether copolymers in which polyamide segments are taken from nylon-6, nylon-11, nylon-12, nylon-666, nylon-612 and the like and polyether segments from polytetramethylene glycol, polypropylene glycol, polyethylene glycol and the like, polyacrylates and the like, elastomers such as natural and synthetic rubbers and thermosetting resins such as phenolic resins, polyesters, epoxy resins, urethane resins and the like. The nylons now listed are commonly accepted in the art, and no explanations will be believed necessary of their physicochemical properties.

Suitable metals typically include aluminum, iron and the like.

As base rubbers there may be used natural rubber (NR), styrene-butadiene rubber (SBR), butadiene rubber (BR), isoprene rubber (IR), acrylonitrile-butadiene rubber (NBR), chlorosulfonated polyethylene (CSM), chlorinated polyethylene (CM), chloroprene rubber (CR), ethylenepropylene-diene rubber (EPDM), butyl rubber (IIR), chlorobutyl rubber (CI-IIR), bromobutyl rubber (Br-IIR), epichlorohydrine rubber (CHR, CHC), acrylic rubber and the like. CSM, IIR, CI-IIR and Br-IIR are particularly preferred which may be employed either alone or in combination with other different rubbers.

In one specific example CSM is a rubber derived by incorporating chlorine and sulfur dioxide into a high-pressure polyethylene and graded usually as having a chlorine content of 25 to 43% and a sulfur content of 0.9 to 1.3%. This rubber excels not only in weather resistance, ozone resistance, chemical resistance, flame retardance and mechanical strength but also in durability against adverse vibration and repetitive pressurization.

Specific examples of fillers include inorganic fillers such as carbon black, white carbon, e.g. anhydrous or hydrous silicic acid, calcium silicate, aluminum silicate or the like, clay, talc, titanium oxide, calcium carbonate, magnesium carbonate, barium sulfate, alumina hydrate and the like either alone or in combination and organic fillers such as phenolic resin, styrene-rich SBR resin and the like. The inorganic filler should not exceed 3% in hydrochloric acid-soluble content for reasons which will follow.

The solubilization quality denotes the content of a metal ion in a given filler component, the ion including $Zn^{2+}$, $Ca^{2+}$, $Al^{3+}$, $Fe^{2+}$, $Fe^{3+}$, $Co^{2+}$ and the like. Too much of the metal ion results in a polymer assembly involving stress crack; that is, the metal ion readily reacts with free chlorine generating for instance from a CSM rubber and thus forms a metal chloride that tends to invite cracking on stress of thermoplastic resins, particularly of nylons such a nylon-6.

The filler should range in amount from 30 to 300 parts by weight, preferably 40 to 270 parts, per 100 parts by weight of the base rubber. Less than 30 parts would not be effective for viscosity buildup to a desirable extent, and more than 300 parts would make the resulting composition inadequately viscous.

Silane coupling agents include for example vinyl type silanes such as vinyltrichlorosilane, vinyltris-(β-methoxyethoxy)silane, vinyltriethoxysilane, vinyltrimethoxysilane and the like, methacryloxy type silanes such as γ-(methacryloxypropyl)trimethoxysilane and the like, epoxy type silanes such as β-(3,4-epoxycyclohexyl)-ethyltrimethoxysilane, γ-glycydoxypropylmethyldiethoxysilane, γ-glycydoxypropyltrimethoxysilane and the like, amine type silanes such as N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane and the like, sulfur-containing type silanes such as γ-mercaptopropyltrimethoxysilane, e.g. one tradenamed KBM 803 and manufactured by ShinEtsu Silicone Co., bis-(3-triethoxysilylpropyl)tetrasulfide, e.g. one tradenamed Si 69 and manufactured by Degussa GmbH, and the like, and halogenated alkyl type silanes such as γ-chloropropyltrimethoxysilane and the like. Particularly preferred are sulfur-containing silanes among which Si 69 is most recommended. The silane compound has a role to improve adhesion between the nipple of the metal fitting and the inner wall of the inner tube.

The coupling agent should be added in an amount of greater than 2 parts by weight, preferably from 3 to 50 parts, based on 100 parts by weight of the base rubber. Less than 2 parts would fail to give sufficient adhesion. More than 50 parts would produce no better results, entailing cost burdens.

Vulcanizing agents depend on the nature of base rubbers, and they include metal oxides, metal peroxides, organic acids and the like for use in CSM. Specific examples include metal oxides such as magnesium oxide, lead oxide, tribasic lead maleate and the like, metal peroxides such as lead peroxide and the like and organic metal salts of resinous acids such as hydrogenated rosin, abietic acid and the like and of fatty acids such as stearic acid, lauric acid and the like. For IIR there may be utilized modified phenol resin, quinone dioxime, alkyl phenol-formaldehyde resin, p-quinone dioxime, p,p'-dibenzoylquinone dioxime, tetrachloro-p-benzoquinone and the like.

The rubber composition of the invention may if necessary be blended with plasticizers, lubricants, antioxidants, vulcanization accelerators, softeners, tackifiers, peptizers, dispersants, processing aids and the like. For instance, plasticizers may be chosen from dibasic acid esters, glycol derivatives, glycerine derivatives, paraffin derivatives and epoxy derivatives in which are included trimellitate ester, dioctyl phthalate, di-n-butyl sebacate and the like. Lubricants typically include stearic acid, metal soap thereof, wax, polyethylene and the like.

Importantly, the composition of the invention should have a minimum viscosity of 45 to 120, preferably 50 to 100, which results from determination at 125° C. on a Mooney viscometer. The viscosity defined herein is generally taken as a magnitude of plasticity of a rubber composition in an unvulcanized state.

Minimum viscosities if lower than 45 would make the after-cure rubber mix insufficiently bondable to both a polymer and a metal and hence liable to leak a fluid in a metal-fitted hose. Lower viscosities would also cause a rubber mix to become too soft and less workable, leading to much deposit on a blender or roll and eventually to poor productivity and irregular quality. Minimum viscosities if higher than 120 would generate heat while in blending or rolling that develops premature crosslinking, i.e. scorching.

On exposure to a higher temperature than 125° C., the composition of the invention gets readily crosslinkable, mechanically strong, adequately bondable to polymeric and metallic materials and rather resistant to strain. Even at below 80° C. at which crosslinking usually initiates, the composition can produce adhesion force and strain resistance to an acceptable extent at a viscosity of not lower than 45 at 125° C.

The composition according to the invention may suitably be interposed between a polymer and a metal and in the form of a cement treated with an organic solvent or a sheet formed by rolling or pressing. The cement is feasible in a concentration usually of about 5 to 50% by weight with the use of toluene, xylene, methyl ethyl ketone, ethyl acetate, hexane or the like. Cementing is convenient in that uniform coating of small thickness is possible with minute adjustment, whereas sheeting facilitates handling and environment qualities.

Where it is used particularly for hose-joint attachment, the composition of the invention may be cemented to a dry thickness of 0.05 to 0.2 mm. At smaller thicknesses than 0.05 mm the cement would be held in diplaced relation at a locally stressed portion on the hose body during clamping of a socket. Proper insertion of the hose into the joint would be difficult to attain at thicknesses larger than 0.2 mm. The thickness requirement equally applies to the case with the sheet.

In accordance with another preferred embodiment of the invention, there is provided a method of integrally bonding a metal joint on to a composite hose with the use of a rubber composition. Details as regards the construction and materials of the hose and the structure and materials of the joint are described in connection with the first embodiment, together with the components of the composition, and illustrated in FIGS. 1 and 2.

As viewed in FIG. 1, the hose 10 is built with a laminated tube 20, the inner wall 20a of the inner tube being formed form the polymers specified hereinabove. Any rubbery materials and polymeric fibers in common use are suitable for the formation of the outer wall 20b of the core tube, the reinforcement layer 30 and the cover 40.

The method according to the invention may be accomplished by disposing the rubber composition, in cement or sheet form, on one end of the hose in a specified area and by mounting the joint on the hose end on which the cement or sheet has been carried, followed by clamping of the joint into fixed relation to the hose end. Clamping is attainable in conventional manner.

The area of the composition to be applied should be preferably in the range of 15 to 85% within an overall hose region defined between the front end 70 of the socket 50a and the rear end 80 of the nipple 50b as seen from FIG. 2. A vacant region in an area of 15% should importantly be left adjacent to the front end of the socket.

Areas below 15% would be too small for bonding between a hose and a joint. Larger areas than 85%, narrower vacant region, would produce acceptable proofness to leak but to an extent to bring the composition into contact with and even into elution in a gaseous fluid, leading to fluid discoloration and often to operation failure.

Either one of the cement-like and sheet-like compositions is feasible in a thickness of 0.05 to 0.2 mm.

The invention will now be described by way of the following examples which are provided for purposes of illustration. In all formulations the numerical figures are expressed in part by weight unless otherwise noted.

EXAMPLES 1 TO 13 AND COMPARATIVE EXAMPLES 1 TO 5

1) Preparation of Cement

Different rubber compositions were prepared as formulated in Table 1. Minimum viscosity measurement was made at 125° C. on a Mooney viscometer by the procedure of JIS K-6300. Each of the composition was treated with toluene to give a test cement having a solid content of 30% by weight.

2) Preparation of Hose

A nylon-6/nylon-11/polyolefin resin was extruded on a thermoplastic extruder around a mandrel to form a tubular inner wall having a thickness of 0.15 mm. The mandrel was one formed of nylon-11 and treated with a releasing agent and having an outside diameter of 10.6 mm. The inner wall-carrying mandrel was thereafter passed through a rubber extruder so that an outer wall of IIR was laminated in a thickness of 2.0 mm over the inner wall. The inner tube thus formed was reinforced by braiding with fibrous polyester around which a cover of Cl-IIR was then extruded in a thickness of 1.5 mm.

The resulting hose was cured under pressure at 150° C. for 60 minutes, followed by pulling of the mandrel out of the vulcanizate.

3) Attachment of Joint to Hose

An aluminum joint of a conventional type was used which was made up of a socket and a nipple. The test cement was applied in a dry thickness of 0.05 mm onto the nipple in an area of 85% within an overall joint region. The hose was allowed to insert into the nipple after which the socket was clamped at a pressure of 60 kgf/cm$^2$.

Performance evaluation was made of the resulting assembly under the conditions given below and with the results shown in Table 2.

4) Aging Test

Aging was done at 160° C. for 24 hours and at 140° C. for 24 hours. The hose after being aged with heat was examined for air tightness, adhesion and resin deterioration.

4-1) Air Tightness

The hose on aging with heat was cooled at room temperature and let to stand in water with the internal pressure held at 50 kgf/cm$^2$. Leakage was adjudged by naked inspection.

The symbol "o" denotes no leak and "x" leak.

4-2) Adhesion

The aged hose was cooled at room temperature and divided at a joint-fitted portion and in a longitudinal direction into two segments. One such segment was forced to delaminate out of the nipple at an angle of 90°.

"P" means peeling between the cement and the nipple and "F" fracture in which the cement fractured and adhered to the nipple and to the hose. "RD" is taken as resin deterioration in which measurement was made impossible.

4-3) Resin Resistance to Deterioration

The deterioration resistance was evaluated to the inner resinous wall of the hose. The hose subjected to the adhesion test was examined with naked eye for cracking on the inner wall.

"o" shows no crack, "Δ" less crack and "x" much crack.

5) Vibration Test

The hose of 215 mm in length, held at a horizontal position, was pressurized at an internal pressure of 40 kgf/cm$^2$ and vibrated diametrically at a width of 1.6 mm, at a frequency of 30 Hz and at a cycle of $10^9$. Subsequent testing involved air tightness and resin deterioration.

5-1) Air Tightness

The procedure of 4-1 was followed except that the internal pressure was varied in the range of 30 to 50 kgf/cm$^2$.

5-2) Resin Resistance to Deterioration

Evaluation was made by the procedure of 4-3.

6) Impulse Test

The hose was allowed to curve in a U shape of 60R and exposed to impact at 150° C., at a reciprocal pressure up to kgf/cm$^2$ and at a cycle of $20^4$ per 35 cycles per minute.

Determination was made of the procedures of 5-1) and 5-2).

As is evident from Table 2, the rubber compositions according to the invention are highly satisfactory in respect of all the test properties. Nil or less silane coupling agent has been found unacceptable in adhesion force and impulse resistance as evidenced by Comparative Examples 1 and 2. Hydrochloric acid-soluble contents falling outside the scope of the invention, Comparative Examples 3 to 5, showed a sharp decline in resin resistance to deterioration.

EXAMPLES 14 TO 20 AND COMPARATIVE EXAMPLES 6 TO 8

7) Preparation of Cement

Ten rubber compositions were prepared according to the recipe shown in Table 3 and admixed on a mixing roll at 60° C. for 15 minutes. Minimum viscosity was measured at 125° C. with the use of a Mooney viscometer.

Each of the compositions was dissolved in an organic solvent into a cement with a solid content of 30% by weight. The solvent was toluene in Examples 14 to 19 and Comparative Examples 6 to 8 and n-hexane in Example 20. Coating was done in two varied thicknesses on a dry basis, one being at 0.05 mm and the other at 0.1 mm.

8) Production of Hose

The method of Example 1-1 was followed in producing different hoses.

A known aluminum-made joint was used which was constituted by a socket and a nipple. The nipple was coated with the cement obtained above and also wound with a sheet formed separately. Sheeting was effected at 0.05, 0.1 and 0.2 mm in thickness. On insertion of the hose into the joint thus treated, the socket was clamped at 60 kgf/cm$^2$. A joint-fitted hose was provided in which the cement or sheet was interposed between the nipple and the inner resinous wall of the core tube.

10) Air Tightness Test

The procedure of Example 1-4-1 was followed except that the internal pressure was varied. The results are shown in Tables 3 to 5.

Evaluation was made as in Example 1-4-1. In Comparative Example 8 the symbol "S" is interpreted to mean that measurement was made impossible due to scorching.

EXAMPLES 21 TO 25 AND COMPARATIVE EXAMPLES 9 TO 11

The procedure of Example 14-10 was followed except for the temperature, time and pressure conditions. Tested were the same cements as in Examples 14 to 18 and Comparative Examples 6 to 8. A control was used in which no adhesive composition was added. The results are shown in Table 6.

EXAMPLES 26 TO 28 AND COMPARATIVE EXAMPLES 12 TO 14

Coat areas were varied as shown in Table 7 with the use of the same cement as in Example 16. This area was taken as a ratio of coat area to hose-nipple bond area. The cement was coated on the nipple in a predetermined area and in a direction from the rear end of the nipple toward the front end of the socket. The resulting hose assembly was examined for air tightness by the procedure of Example 14-10.

Further evaluation was made of aging after oil filling and delamination on nipple attachment under the conditions indicated hereunder and with the results shown in Table 7.

11) Oil-Filled Aging Test

JIS K-6349 7.4(2) was followed at 120° C. for 168 hours. After completion of the treatment, the oil used was taken out of the hose for naked inspection of discoloration.

12) Delamination Test

The joint-fitted hose was divided longitudinally into two segments at a portion above the nipple. The appearance of the cement on the nipple was adjudged by naked inspection.

By the symbol "o" is meant no discoloration or no delamination and "Δ" partial delamination. "x" denotes that the oil discolors severely, or the cement delaminates successively.

As appears clear from Table 3, Examples 14 to 18 and Comparative Examples 6 to 8 show the correlation between the viscosity and the impermeability. Too low viscosities, Comparative Examples 6 and 7, revealed leak even at from 20 to 40 kgf/cm$^2$. Comparative Example 8 is different from Example 5 in that no plasticizer is present with too high a viscosity with the result that the comparative composition was susceptible to scorching while in mixing. Example 19 is directed to the use of CSM combined with carbon black and Example 20 to an IIR-carbon black combination. Both compositions are acceptable in all the test properties.

Examples 21 to 25 and Comparative Examples 9 to 11 demonstrate the criticality of minimum viscosities at 125° C. as against temperatures and pressures. The inventive compositions are sufficiently impermeable at from 80 to 160° C. The higher the minimum viscosity at 125° C., the greater pressure resistance as is apparent from Table 6. This means that the viscosity characteristics according to the invention exhibit notable benefits. Comparative Examples 9 and 10 using lower viscosities revealed leak even at above 120° C. It has now been confirmed that the minimum viscosity should be set at 125° C.

Examples 26 to 29 and Comparative Examples 12 to 14 represent the effects of cement positioning and coat area not only on leak proofness and fluid inertness but also on cement delamination. Comparative Example 12 was unacceptable in impermeability which was attributable to the coat area being too small. Too large coat areas, though sufficiently resistant to leak, were readily susceptible to fluid discoloration and cement delamination as is evident from Comparative Examples 13 and 14. It will be noted therefore that the cement or sheet should be positioned with a blank hose region in an area of 15% left adjacent to the front end of the joint and that the overall coat area should be set at from 15 to 85%.

TABLE 1

| Formulation | HCl-Soluble Content (%) | Comparative Examples 1 | Comparative Examples 2 | 1 | Examples 2 | 3 | 4 | 5 | 6 | Comparative Examples 3 | Comparative Examples 4 | Comparative Examples 5 |
|---|---|---|---|---|---|---|---|---|---|---|---|---|
| CSM[1] | | 100 | 100 | 100 | 100 | 100 | 100 | 100 | 100 | 100 | 100 | 100 |
| white carbon[2] | <0.1 | 45 | 45 | 45 | 45 | 45 | 45 | 45 | 45 | 45 | 45 | 45 |
| barium sulfate[3] | <0.1 | 60 | 60 | 60 | 60 | 60 | 60 | 60 | 60 | 60 | 60 | 60 |
| titanium dioxide[4] | <0.1 | 50 | 50 | 50 | 50 | 50 | 50 | 50 | 50 | 50 | 50 | 50 |
| Mistron Vapor[5] | 0.2 | | | | | | | | 60 | | | |
| Silkalite[6] | 2.8 | | | | | | | | | 60 | | |
| talc[7] | 4.2 | | | | | | | | | | 60 | |
| talc[8] | 8.9 | | | | | | | | | | | 60 |
| Lithopone[9] | 18.0 | | | | | | | | | | | 60 |
| stearic acid | | 2 | 2 | 2 | 2 | 2 | 2 | 2 | 2 | 2 | 2 | 62 |
| trimellitate ester[10] | | 25 | 25 | 25 | 25 | 25 | 25 | 25 | 25 | 25 | 25 | 25 |
| litharge, yellow no. 1 | | 10 | 10 | 10 | 10 | 10 | 10 | 10 | 10 | 10 | 10 | 10 |
| dibenzothiazyl-disulfide[11] | | 0.5 | 0.5 | 0.5 | 0.5 | 0.5 | 0.5 | 0.5 | 0.5 | 0.5 | 0.5 | 0.5 |
| dipentamethylenethiuram-tetrasulfide[12] | | 0.7 | 0.7 | 0.7 | 0.7 | 0.7 | 0.7 | 0.7 | 0.7 | 0.7 | 0.7 | 0.7 |
| silane coupling agent[13] | | 0 | 1 | 3 | 10 | 15 | 30 | 30 | 30 | 30 | 30 | 30 |
| minimum viscosity (125° C.) | | 70 | 70 | 68 | 68 | 65 | 65 | 92 | 95 | 80 | 70 | 65 |

| | HCl-Soluble Content | Examples |
|---|---|---|

TABLE 1-continued

| Formulation | (%) | 7 | 8 | 9 | 4 | 10 | 11 | 12 | 13 |
|---|---|---|---|---|---|---|---|---|---|
| CSM[1] | | 100 | 100 | 100 | 100 | 100 | 100 | 100 | 100 |
| white carbon[2] | <0.1 | 45 | 45 | 45 | 45 | 45 | 45 | 45 | 45 |
| barium sulfate[3] | <0.1 | 0 | 0 | 30 | 60 | 70 | 80 | 80 | 80 |
| titanium dioxide[4] | <0.1 | 0 | 50 | 50 | 50 | 50 | 50 | 50 | 50 |
| Mistron Vapor[5] | 0.2 | | | | | | | 60 | 60 |
| Silkalite[6] | 2.8 | | | | | | | | |
| talc[7] | 4.2 | | | | | | | | |
| talc[8] | 8.9 | | | | | | | | |
| Lithopone[9] | 18.0 | | | | | | | | |
| stearic acid | | 2 | 2 | 2 | 2 | 2 | 2 | 2 | 2 |
| trimellitate ester[10] | | 25 | 25 | 25 | 25 | 25 | 25 | 25 | 25 |
| litharge, yellow no. 1 | | 10 | 10 | 10 | 10 | 10 | 10 | 10 | 10 |
| dibenzothiazyldisulfide[11] | | 0.5 | 0.5 | 0.5 | 0.5 | 0.5 | 0.5 | 0.5 | 0.5 |
| dipentamethylenethiuramtetrasulfide[12] | | 0.7 | 0.7 | 0.7 | 0.7 | 0.7 | 0.7 | 0.7 | 0.7 |
| silane coupling agent[13] | | 30 | 30 | 30 | 30 | 30 | 30 | 30 | 30 |
| minimum viscosity (125° C.) | | 46 | 55 | 60 | 65 | 70 | 75 | 104 | 111 |

TABLE 2

| Properties | Comparative Examples | | Examples | | | | | | Comparative Examples | | | Examples | | | | | | | |
|---|---|---|---|---|---|---|---|---|---|---|---|---|---|---|---|---|---|---|---|
| | 1 | 2 | 1 | 2 | 3 | 4 | 5 | 6 | 3 | 4 | 5 | 7 | 8 | 9 | 4 | 10 | 11 | 12 | 13 |
| Aging Test | | | | | | | | | | | | | | | | | | | |
| 160° C. × 24 hr | | | | | | | | | | | | | | | | | | | |
| air tightness (50 kgf/cm²) | o | o | o | o | o | o | o | o | o | o | o | o | o | o | o | o | o | o | o |
| adhesion | P | F | F | F | F | F | F | F | RD | RD | RD | F | F | F | F | F | F | F | F |
| resin resistance | o | o | o | o | o | o | o | o | x | x | x | o | o | o | o | o | o | o | x |
| 140° C. × 24 hr | | | | | | | | | | | | | | | | | | | |
| air tightness (50 kgf/cm²) | o | o | o | o | o | o | o | o | o | o | o | o | o | o | o | o | o | o | o |
| adhesion | P | P | F | F | F | F | F | F | RD | RD | RD | F | F | F | F | F | F | F | F |
| resin resistance | o | o | o | o | o | o | o | o | Δ | x | x | o | o | o | o | o | o | o | o |
| Vibration Test | | | | | | | | | | | | | | | | | | | |
| air tightness (30 kgf/cm²) | o | o | o | o | o | o | o | o | o | o | o | o | o | o | o | o | o | o | o |
| air tightness (40 kgf/cm²) | o | o | o | o | o | o | o | o | o | o | o | o | o | o | o | o | o | o | o |
| air tightness (50 kgf/cm²) | x | o | o | o | o | o | o | o | o | o | x | o | o | o | o | o | o | o | o |
| resin resistance | o | o | o | o | o | o | o | o | x | x | x | o | o | o | o | o | o | o | o |
| Impulse Test | | | | | | | | | | | | | | | | | | | |
| air tightness (30 kgf/cm²) | o | o | o | o | o | o | o | o | o | o | o | o | o | o | o | o | o | o | o |
| air tightness (40 kgf/cm²) | x | o | o | o | o | o | o | o | o | o | x | o | o | o | o | o | o | o | o |
| air tightness (50 kgf/cm²) | x | x | o | o | o | o | o | o | o | x | x | x | x | o | o | o | o | o | o |
| resin resistance | o | o | o | o | o | o | o | o | x | x | x | o | o | o | o | o | o | o | o |

TABLE 3

| Formulation/Properties | | Examples | | | | | Comparative Examples | | |
|---|---|---|---|---|---|---|---|---|---|
| | | 14 | 15 | 16 | 17 | 18 | 6 | 7 | 8 |
| CSM[1] | | 100 | 100 | 100 | 100 | 100 | 100 | 100 | 100 |
| white carbon[2] | | 45 | 45 | 45 | 45 | 45 | 45 | 45 | 45 |
| Mistron Vapor[5] | | 60 | 60 | 60 | 60 | 60 | 60 | 60 | 60 |
| titanium dioxide[4] | | 50 | 50 | 50 | 50 | 50 | 50 | 50 | 50 |
| stearic acid | | 2 | 2 | 2 | 2 | 2 | 2 | 2 | 2 |
| trimellitate ester[10] | | 50 | 40 | 30 | 25 | 10 | 100 | 60 | 0 |
| litharge, yellow no. 10 | | 10 | 10 | 10 | 10 | 10 | 10 | 10 | 10 |
| accelerator, DM[11] | | 0.5 | 0.5 | 0.5 | 0.5 | 0.5 | 0.5 | 0.5 | 0.5 |
| accelerator TRA[12] | | 0.7 | 0.7 | 0.7 | 0.7 | 0.7 | 0.7 | 0.7 | 0.7 |
| minimum viscosity (125° C.) | | 45 | 53 | 71 | 92 | 120 | 20 | 35 | |
| cement coating (160° C. × 24 hr) | | | | | | | | | |
| coat thickness (mm) | | 0.05 0.1 | 0.05 0.1 | 0.05 0.1 | 0.05 0.1 | 0.05 0.1 | 0.05 0.1 | 0.05 0.1 | |
| air tightness (kgf/cm²) | 5 | o o | o o | o o | o o | o o | o o | o o | S |
| | 10 | o o | o o | o o | o o | o o | o o | o o | |
| | 20 | o o | o o | o o | o o | o o | x o | o o | |
| | 30 | o o | o o | o o | o o | o o | — x | x o | |
| | 40 | o o | o o | o o | o o | o o | — — | — x | |
| | 50 | x o | o o | o o | o o | o o | — — | — — | |
| sheet covering (160° C. × 24 hr) | | | | | | | | | |
| sheet thickness (mm) | | 0.1 0.2 | 0.1 0.2 | 0.1 0.2 | 0.1 0.2 | 0.1 0.2 | 0.1 0.2 | 0.1 0.2 | |
| air tightness (kgf/cm²) | 10 | o o | o o | o o | o o | o o | o o | o o | |
| | 20 | o o | o o | o o | o o | o o | o o | o o | |
| | 30 | o o | o o | o o | o o | o o | x o | o o | |
| | 40 | o o | o o | o o | o o | o o | — x | x o | |

TABLE 3-continued

| Formulation/Properties | | Examples | | | | | Comparative Examples | | |
|---|---|---|---|---|---|---|---|---|---|
| | | 14 | 15 | 16 | 17 | 18 | 6 | 7 | 8 |
| | 50 | o | o | o | o | o | — | — | — | o |

TABLE 4

| Formulation/Properties | | Example 19 | |
|---|---|---|---|
| CSM[1) | | 100 | |
| carbon black[14) | | 80 | |
| AC polyethylene | | 3 | |
| trimellitate ester[10) | | 10 | |
| litharge, yellow no. 10 | | 10 | |
| accelerator TRA[12) | | 2 | |
| minimum viscosity (125° C.) | | 70 | |
| cement coating (160° C. × 24 hr) | | | |
| coat thickness (mm) | | 0.05 | 0.1 |
| air tightness (kgf/cm$^2$) | 5 | o | o |
| | 10 | o | o |
| | 20 | o | o |
| | 30 | o | o |
| | 40 | o | o |
| | 50 | o | o |
| sheet covering (160° C. × 24 hr) | | | |
| sheet thickness (mm) | | 0.1 | 0.2 |
| air tightness (kgf/cm$^2$) | 10 | o | o |
| | 20 | o | o |
| | 30 | o | o |
| | 40 | o | o |
| | 50 | o | o |

TABLE 5

| Formulation/Properties | | Example 20 | |
|---|---|---|---|
| IIR[15) | | 100 | |
| carbon black[16) | | 65 | |
| AC polyethylene | | 10 | |
| stearic acid | | 3 | |
| softener[17) | | 8 | |
| phenol resin[18) | | 6 | |
| minimum viscosity (125° C.) | | 61 | |
| cement coating (160° C. × 24 hr) | | | |
| coat thickness (mm) | | 0.05 | 0.1 |
| air tightness (kgf/cm$^2$) | 5 | o | o |
| | 10 | o | o |
| | 20 | o | o |
| | 30 | o | o |
| | 40 | o | o |
| | 50 | o | o |
| sheet covering (160° C. × 24 hr) | | | |
| sheet thickness (mm) | | 0.1 | 0.2 |
| air tightness (kgf/cm$^2$) | 10 | o | o |
| | 20 | o | o |
| | 30 | o | o |
| | 40 | o | o |
| | 50 | o | o |

TABLE 6

| Formulation/Properties | | Control | Examples | | | | | | | Comparative Examples | | | | | | |
|---|---|---|---|---|---|---|---|---|---|---|---|---|---|---|---|---|
| | | | 21 | | 22 | | 23 | | 24 | | 25 | | 9 | | 10 | | 11 |
| CSM[1) | | | 100 | | 100 | | 100 | | 100 | | 100 | | 100 | | 100 | | 100 |
| white carbon[2) | | | 45 | | 45 | | 45 | | 45 | | 45 | | 45 | | 45 | | 45 |
| Mistron Vapor[5) | | | 60 | | 60 | | 60 | | 60 | | 60 | | 60 | | 60 | | 60 |
| titanium dioxide[4) | | | 50 | | 50 | | 50 | | 50 | | 50 | | 50 | | 50 | | 50 |
| stearic acid | | | 2 | | 2 | | 2 | | 2 | | 2 | | 2 | | 2 | | 2 |
| trimellitate ester[10) | | | 50 | | 40 | | 30 | | 25 | | 10 | | 100 | | 60 | | 0 |
| litharge, yellow no. 10 | | | 10 | | 10 | | 10 | | 10 | | 10 | | 10 | | 10 | | 10 |
| accelerator DM[11) | | | 0.5 | | 0.5 | | 0.5 | | 0.5 | | 0.5 | | 0.5 | | 0.5 | | 0.5 |
| accelerator TRA[12) | | | 0.7 | | 0.7 | | 0.7 | | 0.7 | | 0.7 | | 0.7 | | 0.7 | | 0.7 |
| minimum viscosity (125° C.) | | | 45 | | 53 | | 71 | | 92 | | 120 | | 20 | | 35 | | |
| cement coating | | | | | | | | | | | | | | | | | |
| coat thickness (mm) | | — | 0.05 | 0.1 | 0.05 | 0.1 | 0.05 | 0.1 | 0.05 | 0.1 | 0.05 | 0.1 | 0.05 | 0.1 | 0.05 | 0.1 | |
| air tightness (160° C. × 24 hr) | 5 | x | o | o | o | o | o | o | o | o | o | o | o | o | o | o | S |
| | 10 | — | o | o | o | o | o | o | o | o | o | o | o | o | o | o | |
| | 20 | — | o | o | o | o | o | o | o | o | o | o | x | o | o | o | |
| | 30 | — | o | o | o | o | o | o | o | o | o | o | — | x | x | o | |
| | 40 | — | o | o | o | o | o | o | o | o | o | o | — | — | — | x | |
| | 50 | — | x | o | o | o | o | o | o | o | o | o | — | — | — | — | |
| | 60 | — | — | x | x | x | x | x | x | x | x | x | — | — | — | — | |
| air tightness (140° C. × 24 hr) | 10 | x | o | | o | | o | | o | | o | | o | o | o | o | |
| | 20 | — | o | | o | | o | | o | | o | | o | | o | | |
| | 30 | — | o | | o | | o | | o | | o | | x | | o | | |
| | 40 | — | o | | o | | o | | o | | o | | — | | x | | |
| | 50 | — | o | | o | | o | | o | | o | | — | | — | | |
| | 60 | — | x | | x | | x | | o | | o | | — | | — | | |
| | 70 | — | — | | — | | — | | x | | x | | — | | — | | |
| air tightness (120° C. × 24 hr) | 40 | o | o | | o | | o | | o | | o | | o | | o | | |
| | 50 | x | o | | o | | o | | o | | o | | o | | o | | |
| | 60 | — | o | | o | | o | | o | | o | | x | | x | | |
| | 70 | — | x | | x | | x | | x | | x | | — | | — | | |
| air tightness (100° C. × 24 hr) | 50 | o | o | | o | | o | | o | | o | | o | | o | | |
| | 60 | x | o | | o | | o | | o | | o | | o | | o | | |
| | 70 | — | o | | o | | o | | o | | o | | x | | x | | |
| air tightness (80° C. × 24 hr) | 50 | o | o | | o | | o | | o | | o | | o | | o | | |
| | 60 | x | o | | o | | o | | o | | o | | o | | o | | |
| | 70 | — | o | | o | | o | | o | | o | | x | | x | | |

TABLE 7

| Properties | Comparative Example 12 | Examples 26 | Examples 27 | Examples 28 | Comparative Examples 13 | Comparative Examples 14 |
|---|---|---|---|---|---|---|
| coat area (%) | 10 | 15 | 50 | 85 | 90 | 100 |
| air tightness (50 kgf/cm² after 160° C. × 24 hr) | | | | | | |
| coat | 0.05 | x | o | o | o | o | o |
| thickness (mm) | 0.1 | o | o | o | o | o |
| aging after oil filling (120° C. × 168 hr) | o | o | o | o | x | x |
| delamination on nipple insertion | o | o | o | Δ | x | x |

Notes to Tables

| Material | Maker | Nature |
|---|---|---|
| 1) Hypalon 40 | DuPont | |
| 2) Nipsil AQ | Nippon Silica | silicon dioxide |
| 3) No. 100, precipitated | Sakai Chemical | |
| 4) Tiepake R-820 | Ishihara Sangyo | |
| 5) Mistron Vapor | Nippon Mistron | magnesium silicate |
| 6) Silkalight | Takehara Chemical | aluminum silicate-magnesium silicate |
| 7) Talc F | Nippon Talc | magnesium silicate |
| 8) Talc SP 50A | Fuji Talc | magnesium silicate |
| 9) Lithopone D | Sachtleben | zinc sulfide-barium sulfate |
| 10) Witmol 218 | Dynamite Nobel | plasticizer |
| 11) Sunceller DM-PO | Sanshin Chemical | accelerator |
| 12) Sunceller TRA | Sanshin Chemical | accelerator |
| 13) Si 69 | Degussa | |
| 14) Asahi No. 50 | Asahi Carbon | SRF |
| 15) Exxon Butyl 268 | Exxon | isobutylene-isoprene |
| 16) Showblack N220 | Showa Cabot | ISAF |
| 17) Machine Oil 22 | Fuji Kosan | paraffinic oil |
| 18) Tackyroll 250-T | Taoka Chemical | brominated alkylphenol-formaldehyde resin |

What is claimed is:

1. A method of integrally attaching a composite hose to a metal fitting, said hose comprising an inner tube, a reinforcing layer and a cover superimposed in the order mentioned, said inner tube including an inner peripheral wall formed of a polymeric material and an outer peripheral wall formed of a rubbery material, which method comprises:
   (a) disposing a rubber composition on said hose at an end thereof and in a predetermined area thereof;
   (b) mounting said fitting on said composition disposed on said hose; and
   (c) subsequently clamping said metal fitting into fixed relation to said hose end;
   wherein said rubber composition comprises;
   (d) 100 parts by weight of a base rubber selected from the group consisting of chlorosulfonated polyethylene rubber, butyl rubber, chlorobutyl rubber and bromobutyl rubber;
   (e) 30 to 300 parts by weight of at least one inorganic or organic filler, said inorganic filler having a hydrochloric acid-soluble content of less then 3%;
   (f) two or greater parts by weight of a silane coupling agent; and
   (g) a vulcanizing agent, whereby said composition has a minimum viscosity of from 45 to 120 as determined at 125° C. on a Mooney viscometer.

2. The method according to claim 1 wherein said rubber composition is in a cement form.

3. The method according to claim 1 wherein said rubber composition is in a sheet form.

4. The method according to claim 1, wherein said predetermined area is from 15% to 85% of the overall hose region extending between a front end and a rear end of said metal fitting mounted on said hose end, but not including an area adjacent the front end of said fitting which is equal to 15% of said overall hose region between the front and rear ends of said metal fitting.

* * * * *